(12) United States Patent
Lapp et al.

(10) Patent No.: US 10,221,936 B2
(45) Date of Patent: Mar. 5, 2019

(54) EXTERNAL COOLING CIRCUIT AND ADAPTER FOR USE WITH INTEGRATED HYDROSTATIC TRANSAXLE

(71) Applicant: Schiller Grounds Care, Inc., Southampton, PA (US)

(72) Inventors: Jonathan Lapp, Johnson Creek, WI (US); Mark J. Wegner, Watertown, WI (US)

(73) Assignee: Schiller Grounds Care, Inc., Southampton, PA (US)

(*) Notice: Subject to any disclaimer, the term of this patent is extended or adjusted under 35 U.S.C. 154(b) by 206 days.

(21) Appl. No.: 15/179,165

(22) Filed: Jun. 10, 2016

(65) Prior Publication Data

US 2016/0363209 A1     Dec. 15, 2016

Related U.S. Application Data

(60) Provisional application No. 62/240,127, filed on Oct. 12, 2015, provisional application No. 62/173,621, filed on Jun. 10, 2015.

(51) Int. Cl.
| | |
|---|---|
| *F16D 31/02* | (2006.01) |
| *F16H 57/04* | (2010.01) |
| *B60K 17/10* | (2006.01) |
| *F15B 21/042* | (2019.01) |
| *F16H 61/4165* | (2010.01) |

(52) U.S. Cl.
CPC ....... *F16H 57/0417* (2013.01); *B60K 17/105* (2013.01); *F15B 21/042* (2013.01); *F16H 61/4165* (2013.01)

(58) Field of Classification Search
CPC ............................ F16H 61/4165; F15B 21/042

USPC ................................................ 60/456, 488
See application file for complete search history.

(56) References Cited

U.S. PATENT DOCUMENTS

| | | | | |
|---|---|---|---|---|
| 5,622,051 A | * | 4/1997 | Iida ...................... | B60K 17/10 60/456 |
| 6,073,443 A | * | 6/2000 | Okada .................. | F16H 39/14 60/456 |
| 6,626,065 B2 | * | 9/2003 | Arnold ................ | B60K 17/105 475/72 |

(Continued)

OTHER PUBLICATIONS

Hydro-Gear, "ZT-2800®/ZT-3100TM/ZT-3400TM Integrated Zero-Turn Transaxle Service and Repair Manual," Aug. 2010, 52 pages.

*Primary Examiner* — Michael Leslie
(74) *Attorney, Agent, or Firm* — Panitch Schwarze Belisario & Nadel LLP

(57) ABSTRACT

An external cooling circuit for an integrated transaxle includes an integrated transaxle having a casing and a motor and a pump contained within the casing. The pump is connected to and actuable by an input shaft extending from the casing. The motor is connected to an output shaft extending from the casing. Hydraulic fluid is circulated in the casing by the pump to drive the motor. First and second ports are formed in the casing and a charge pump is contained within the casing. A reservoir is external to the casing. The reservoir is in fluid communication with the first and second ports of the casing such that the charge pump is configured to create a vacuum at the second port to cause hydraulic fluid to exit the casing through the first port, enter the reservoir, and re-enter the casing through the second port.

20 Claims, 7 Drawing Sheets

(56) References Cited

U.S. PATENT DOCUMENTS

| | | | | |
|---|---|---|---|---|
| 7,121,091 B2 * | 10/2006 | Ohashi | ............... | F04B 1/2064 |
| | | | | 60/456 |
| 7,654,083 B2 * | 2/2010 | Iida | ............... | B60K 17/105 |
| | | | | 60/454 |
| 8,745,983 B2 * | 6/2014 | Hardzinski | ......... | F16H 61/4078 |
| | | | | 60/456 |

* cited by examiner

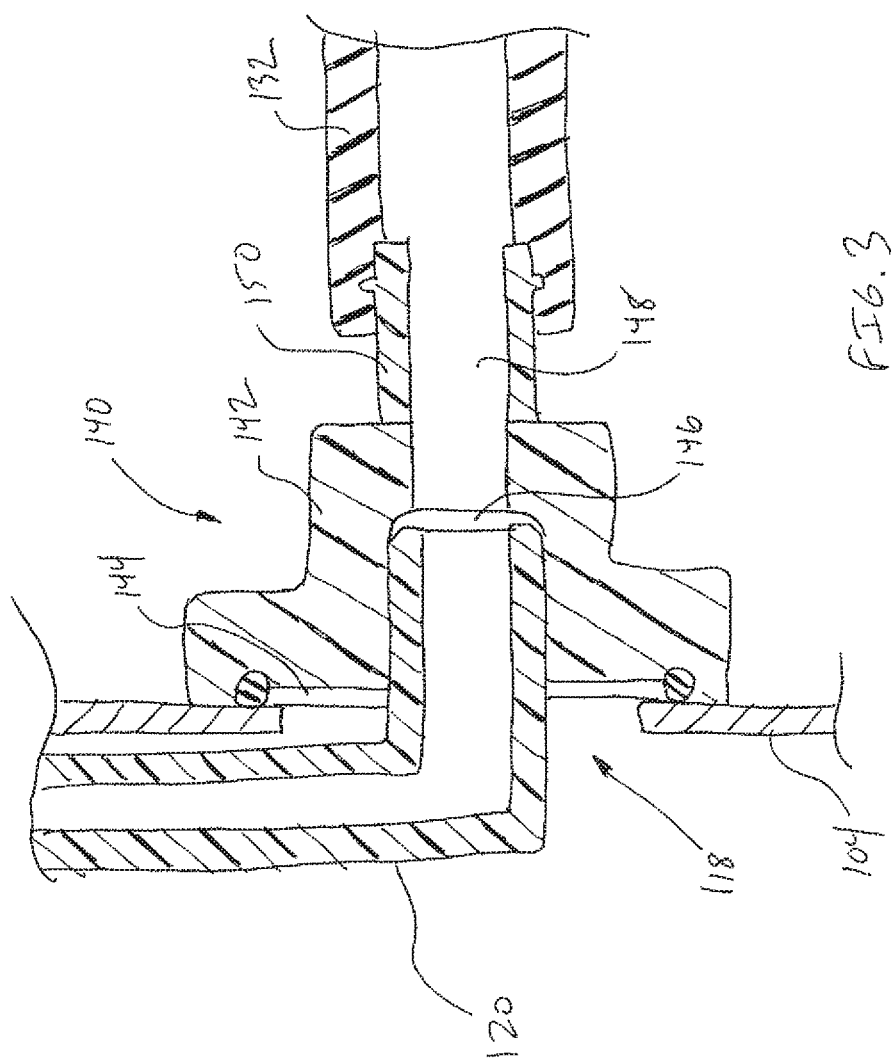

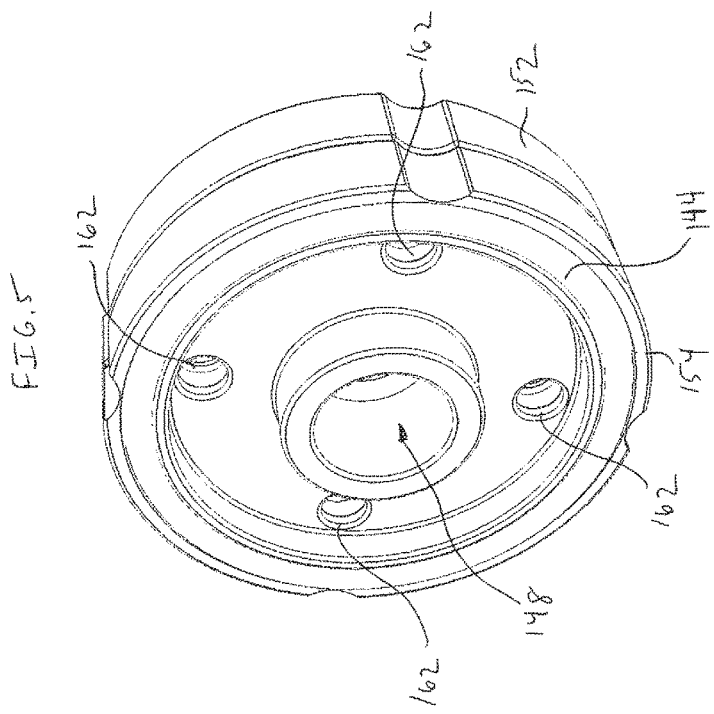
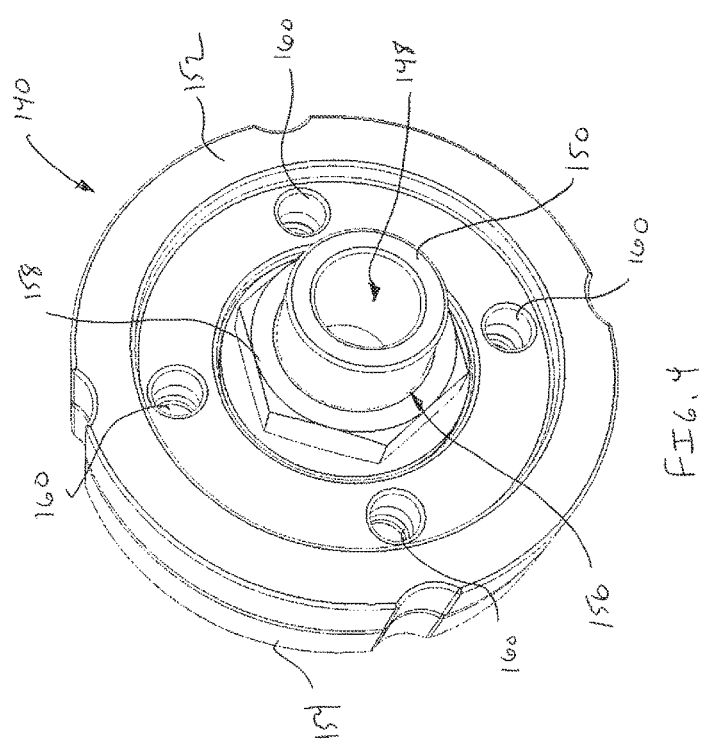

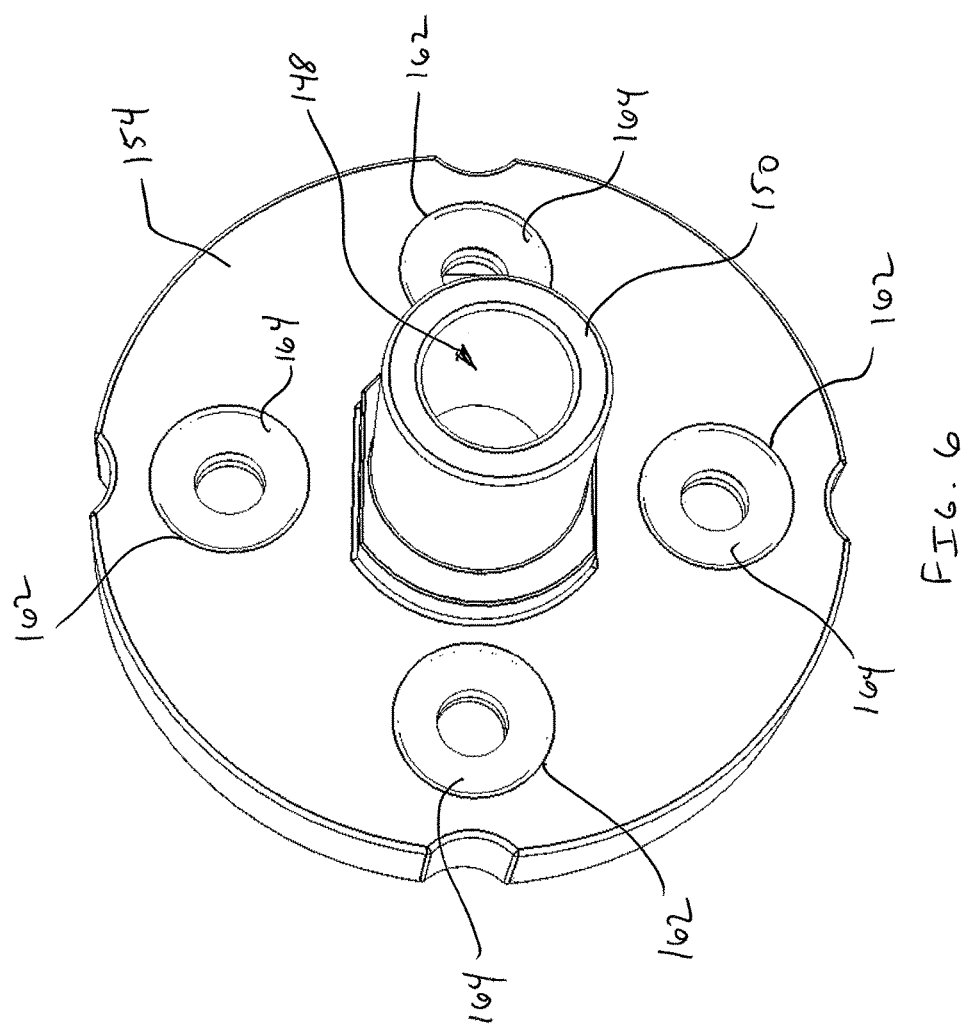

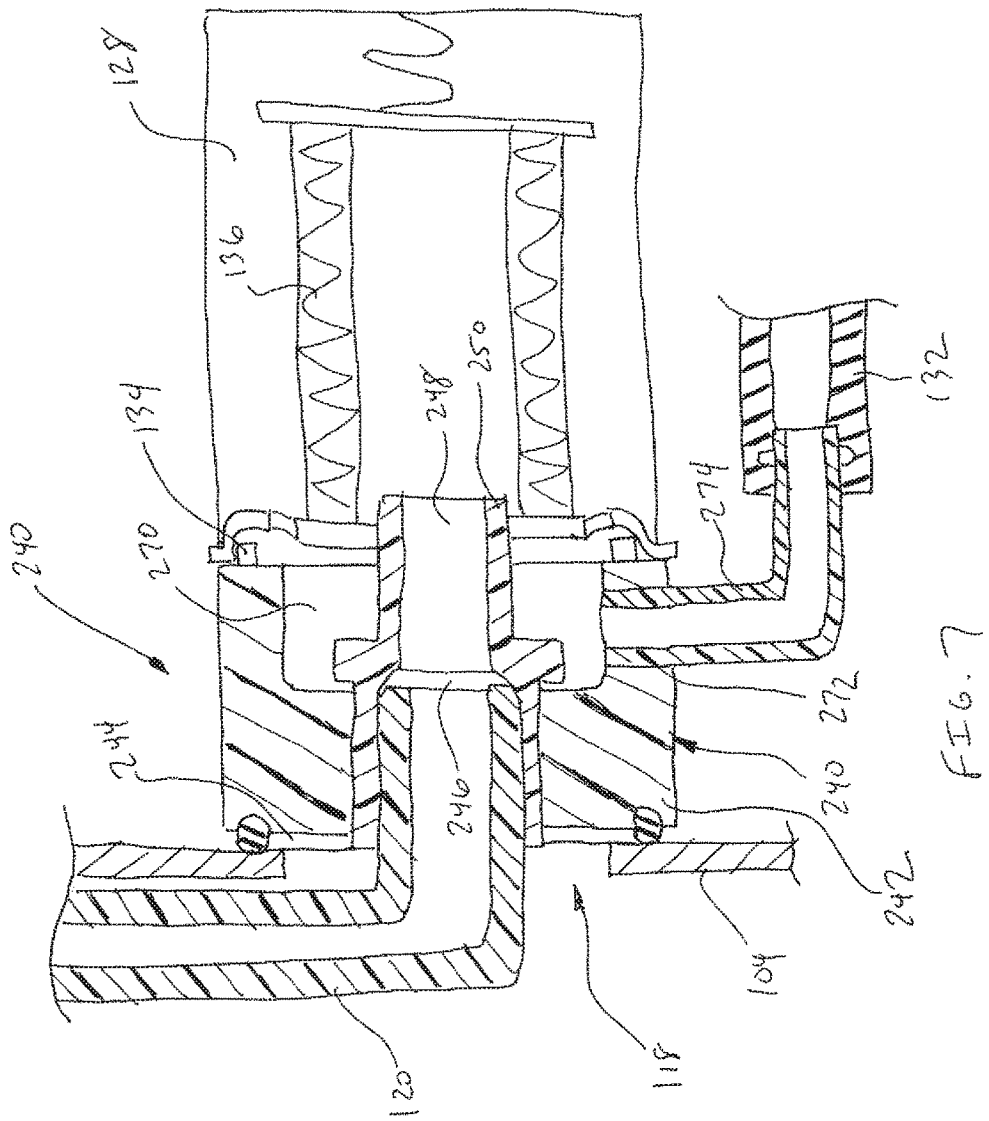

EXTERNAL COOLING CIRCUIT AND ADAPTER FOR USE WITH INTEGRATED HYDROSTATIC TRANSAXLE

CROSS-REFERENCE TO RELATED APPLICATIONS

This application claims the benefit of U.S. Provisional Patent Application No. 62/173,621, filed on Jun. 10, 2015, entitled "Cooling Circuit for Integrated Transaxle", currently pending, and also claims the benefit of U.S. Provisional Patent Application No. 62/240,127, filed on Oct. 12, 2015, entitled "External Cooling Circuit and Adapter for Use with Integrated Hydrostatic Transaxle," currently pending, the entire contents of all of which are incorporated by reference herein.

BACKGROUND OF THE INVENTION

An embodiment of the present invention relates generally to integrated hydrostatic transaxles, and more particularly, to an external cooling circuit and adapter for use with integrated hydrostatic transaxles.

Hydrostatic traction drive technology is commonly employed in the turf care industry. Recently, the trend has been toward the use of integrated hydrostatic transaxles in lawn care machines for the consumer and professional lawn mower markets, particularly in "zero-turn"-type machines. The integrated transaxles combine all of the hydrostatic drive functions (e.g., hydraulic pump, motor, and the like) into a single housing, which makes it very economical for machine manufacturers to utilize hydrostatic traction drives. Cooling an integrated transaxle is typically performed by a fan mounted on, and driven by, the transaxle input shaft. The only required external connection is a single hose coupled to an overflow bottle, which is very similar to the overflow bottle commonly used on automotive engine cooling systems.

However, in certain applications it has been difficult or impossible to get enough cooling to the transaxle to allow operation at the desired speeds and loads. Common approaches to addressing overheating include (i) using various means to direct air as close to ambient temperature as possible to the cooling fans; (ii) directing air from the fans over the transaxles to provide the most cooling possible; (iii) reducing loads on the transaxle to reduce heat; and (iv) reverting to non-integrated hydrostatic solutions.

While solutions (i) and (ii) are fairly simple to implement, these methods do not always provide sufficient cooling capacity. For solution (iii), a reduction of load means slowing the machine or reducing the rate at which the machine performs work. This is undesirable, particularly if the machine is in commercial use. In particular, the owner of a commercial machine typically earns payment for work performed and the faster the machine can operate, the more income and profits can be generated. Finally, solution (iv) results in higher production costs due to the need for each individual component to have its own housing, fittings, tubes, hoses, and the like, as well as the cost of labor for assembling these components.

Some hydrostatic transaxle models, particularly those intended for commercial applications, include charge pumps and oil filters as part of the transaxle assembly. These systems use the transaxle casing as a reservoir and an overflow bottle to maintain oil levels. It is desirable to leverage this structure in order to provide additional cooling to the integrated transaxle.

Further, assembly lines for integrated hydrostatic transmissions are not set up for remote, external circulation of transaxle oil during the test procedures. In normal integrated testing, the filter is installed on the transaxle, the case is filled with oil, testing is completed, and the fill port sealed for shipment to the OEM customer. There are no known approaches for external circulation since this is an entirely new concept. However, several principles must be considered. First, providing an additional test station on the assembly line, particularly to an existing line, is expensive and burdensome. Second, solutions requiring opening of the system after testing are messy (due to potential oil loss) and still require substantial variation of the assembly process. Third, transferring the burden to the customer is not ideal.

It is therefore desirable to provide an integrated transaxle capable of external circulation without significantly modifying the assembly line and without creating a mess.

BRIEF SUMMARY OF THE INVENTION

Briefly stated, an embodiment of the present invention includes an external cooling circuit for an integrated transaxle, including an integrated transaxle having a casing and a motor and a pump contained within the casing. The pump is connected to and actuable by an input shaft extending from the casing. The motor is connected to an output shaft extending from the casing. Hydraulic fluid is circulated in the casing by the pump to drive the motor. First and second ports are formed in the casing and a charge pump is contained within the casing. A reservoir is external to the casing, the reservoir being in fluid communication with the first and second ports of the casing such that the charge pump is configured to create a vacuum at the second port to cause hydraulic fluid to exit the casing through the first port, enter the reservoir, and re-enter the casing through the second port.

Another embodiment of the present invention includes an adapter for use with an external cooling circuit of an integrated transaxle and a filter. The integrated transaxle has a casing and a filter port. The filter port includes an opening in a wall of the casing and an open-ended passage concentrically arranged within the opening and in fluid communication with a charge pump. The adapter includes a first plate with an axially extending central opening, a second plate connected to the first plate and rotatable with respect to the first plate about a rotation axis passing longitudinally through the central opening of the first plate, a fitting extending from the second plate and passing through the central opening of the first plate, at least one first peripheral axially extending channel arranged in the first plate and radially spaced apart from the central opening, and at least one second peripheral axially extending channel arranged in the second plate and radially spaced apart from the fitting. The at least one first peripheral channel being alignable with the at least one second peripheral channel via relative rotation of the first and second plates.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

FIG. 3 is an enlarged, cross-sectional partial view of an adapter in use with the external cooling circuit of FIG. 2;

FIG. 4 is a front perspective view of an alternative embodiment of the adapter of FIG. 3;

FIG. 5 is a rear perspective view of the adapter of FIG. 4;

FIG. 6 is a front perspective view of the adapter of FIG. 4 with a front plate removed;

FIG. 7 is an enlarged, cross-sectional partial view of another alternative adapter in use with the external cooling circuit of FIG. 2.

DETAILED DESCRIPTION OF THE INVENTION

Figure 1:
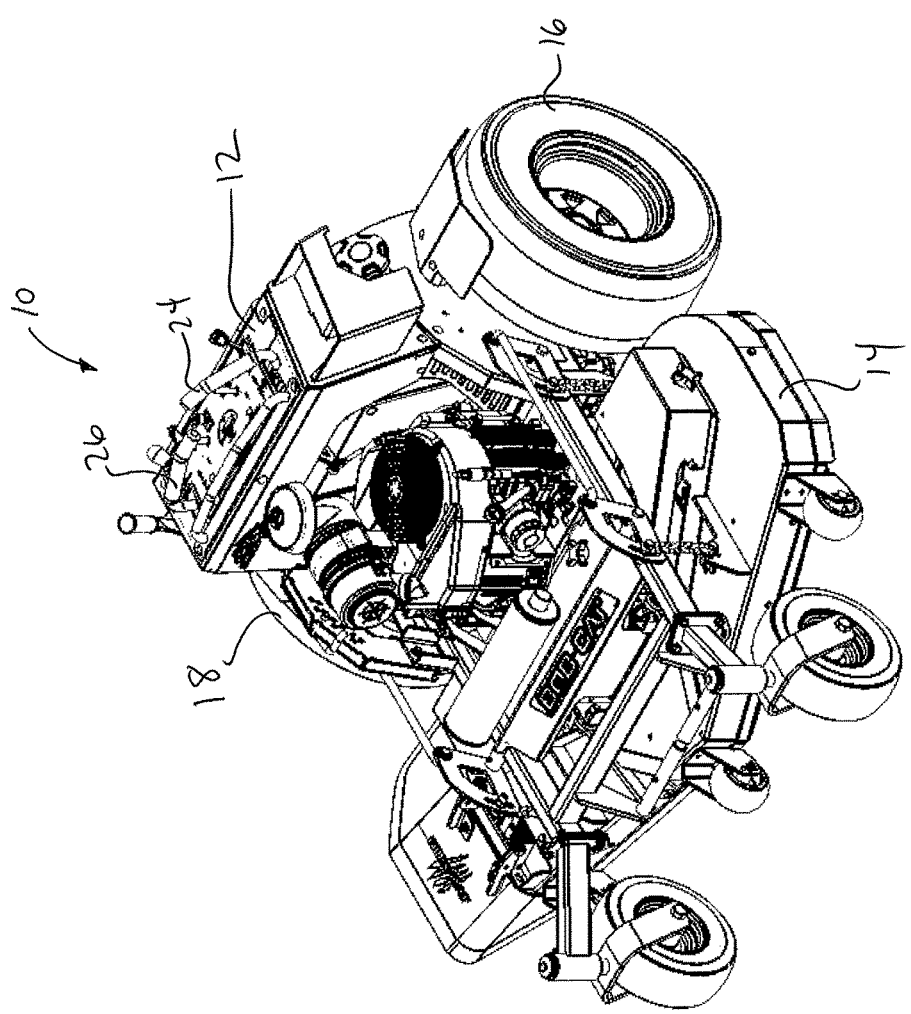
FIG. 1 is a front perspective view of a lawn mower utilizing a transaxle cooling system in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail there is shown in FIG. 1 a zero-turn lawn mower 10 which is capable of utilizing embodiments of the present invention directed to transaxle cooling.

The mower 10 includes a control panel 12 and a cutting deck 14. The control panel 12 is positioned between left and right drive wheels 16, 18. Two drive handles 24, 26 are provided for controlling forward and rearward motion of the respective sides of the mower 10 via connection to respective integrated transaxles (not shown in FIG. 1) for driving the corresponding left and right drive wheels 16, 18. While a stand-on lawn mower 10 is shown in FIG. 1, it is understood by one skilled in the art that the embodiments of the invention described herein may be utilized with other types of machines utilizing integrated transaxles for motive power, such as aerators, seeders, tractors, loaders, or the like, and may be utilized for riding, stand-on, or walk-behind operations.

Figure 8:
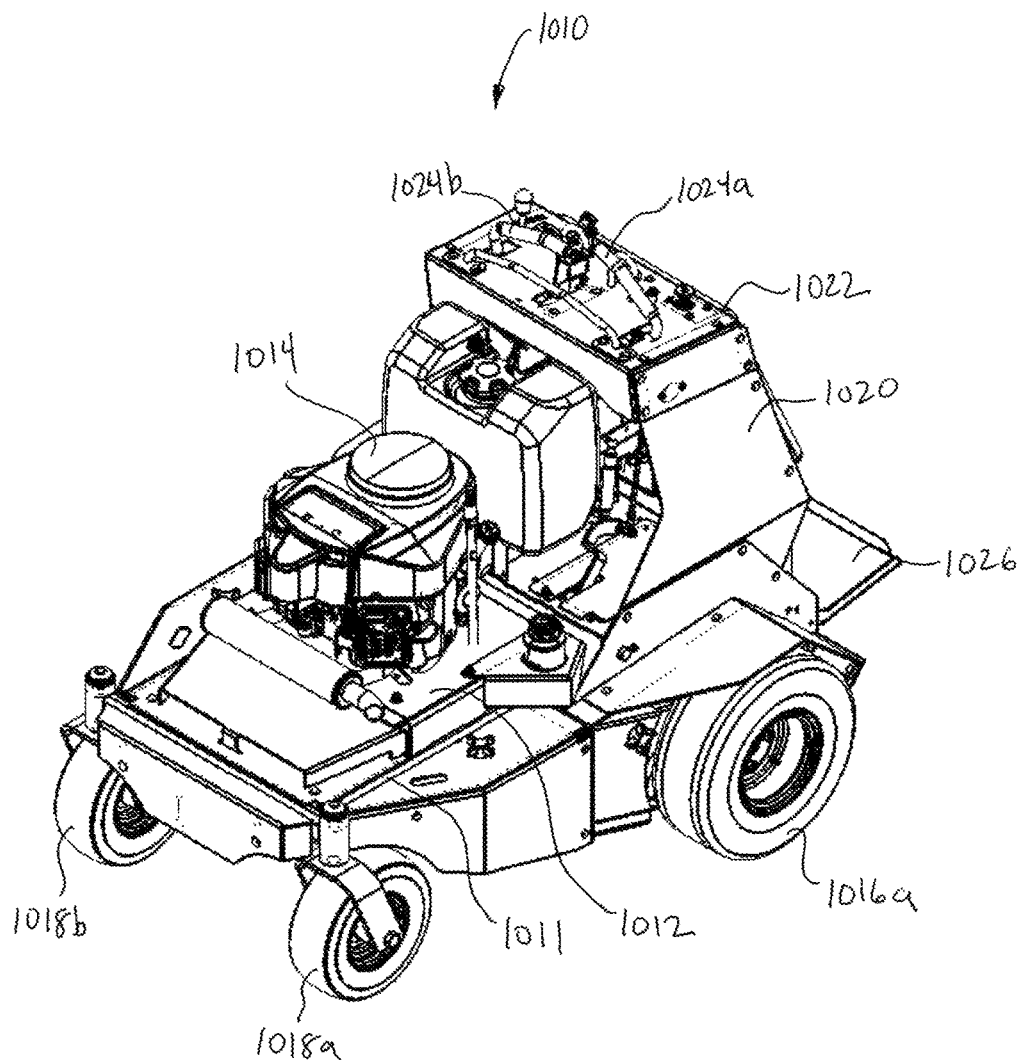
FIG. 8 is a front perspective view of a stand-on aerator utilizing a transaxle cooling system in accordance with a preferred embodiment of the present invention.

For example, FIG. 8 shows a stand-on an aerator 1010 in accordance with a preferred embodiment of the present invention. The aerator 1010 includes a chassis 1011 having an engine deck 1012 supporting an engine 1014 that supplies rotational energy for driving left and right drive wheels 1016a (right drive wheel not visible in FIG. 8) rotatably mounted at a rear of the chassis 1011. Preferably, the left drive wheel 1016a and right drive wheel are independently rotatable in forward and reverse directions by corresponding left and right integrated transaxles (not shown in FIG. 8) that are operationally coupled to the engine 1014. A pair of driven wheels 1018a, 1018b are supported at a front end of the chassis 1011, and are preferably free to rotate as the left drive wheel 1016a and right drive wheel move the aerator 1010 along the ground.

The chassis 11 further supports a control tower 1020 mounted rearwardly of the engine deck 1012. A control panel 1022 is arranged atop the control tower 1020 to allow an operator to control movement and operation of the aerator 1010. In particular, the control panel 1022 includes a pair of traction levers 1024a, 1024b that are respectively coupled to a corresponding transaxle for actuating forward or reverse rotation of the corresponding left drive wheel 1016a and right drive wheel. Movement of one of the traction levers 1024a, 1024b in the forward direction results in rotation of the corresponding drive wheel in the forward direction, with reverse movement of the traction lever 1024a, 1024b resulting in reverse rotation of the corresponding drive wheel. Other types of controls, such as a parking brake, tine bank lift actuator, or the like may also be utilized on the control panel 22. A stowable operator platform 1026 is mounted at the rear of the chassis 1011. A tine bank (not shown), as is conventionally known for aerators, is preferably located within the chassis 1011 between the left drive wheel 1016a and the right drive wheel.

Figure 2:
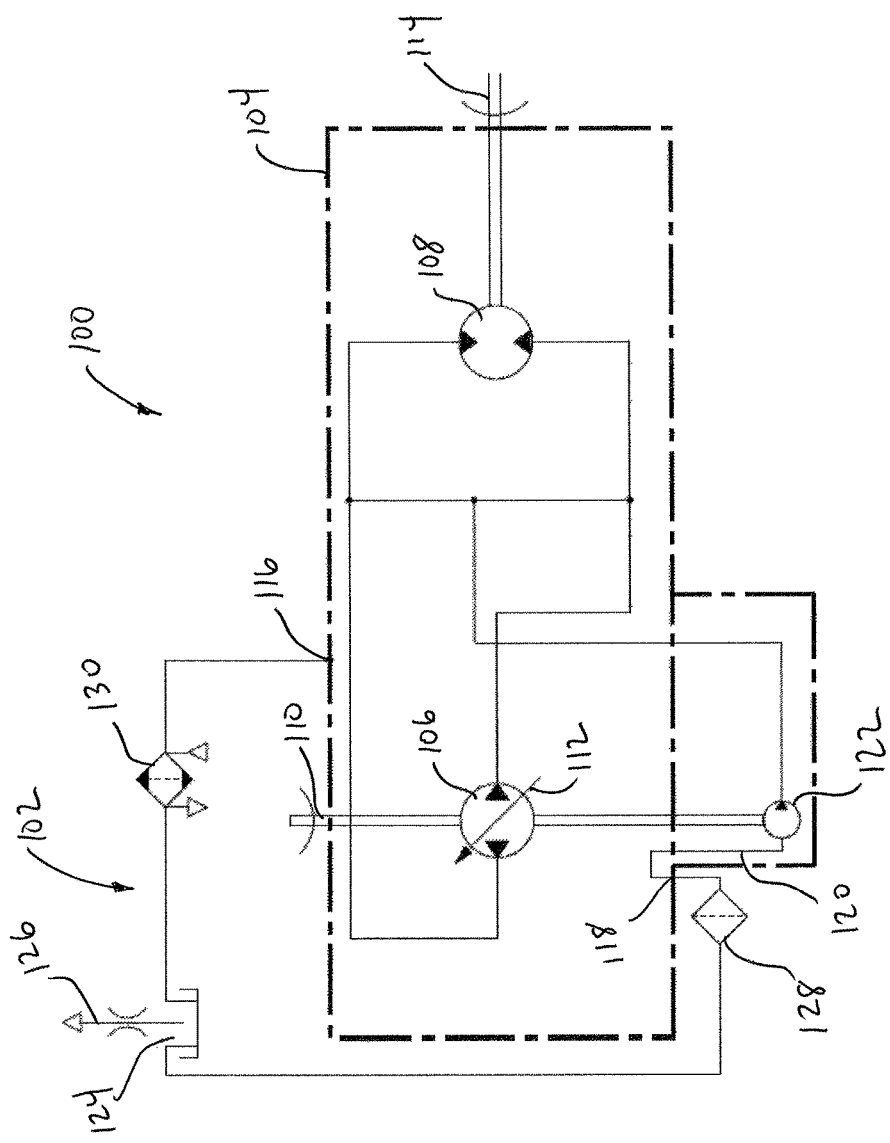
FIG. 2 is a schematic view of an integrated transaxle with an external cooling circuit in accordance with a preferred embodiment of the present invention.

FIG. 2 shows (schematically) an integrated transaxle 100 using an external cooling circuit 102 in accordance with a first preferred embodiment of the present invention. The transaxle 100 shown in FIG. 2 is commercially available from Hydro Gear Co., Ltd. in Sullivan, Ill. A description of nonessential components for implementing embodiments of the present invention, such as system check valves, charge relief valves, and the like, is omitted for simplicity. The transaxle 100 includes a casing 104 that acts as a reservoir for hydraulic fluid, e.g., oil or the like (not shown), utilized within the transaxle 100. The casing 104 encloses a pump 106 and a motor 108. An input shaft 110 projects externally from the casing 104 and is connected to the pump 106. The input shaft 110 is generally rotated about its longitudinal axis, typically by a belt (not shown) driven by an engine power take-off (PTO) shaft (not shown) of the mower 10, in order to supply power to the pump 106. The pump 106 may have an actuator 112, such as a swash-plate or the like, which can be manipulated by an external control (e.g., drive handle 24 in FIG. 1) to cause the pump 106 to circulate the hydraulic fluid within the transaxle 100 in a particular direction. The circulating fluid drives the motor 108, which is connected to a motor shaft 114 extending externally from the casing 104. The motor shaft 114 can, for example, be used to rotate a drive wheel 11 (FIG. 1). The direction of rotation of the drive wheel 16, 18 therefore corresponds ultimately to the direction of flow of the hydraulic fluid in the transaxle 100.

The casing 104 further includes an overflow port 116 that would typically be coupled to an expansion tank with a vented cap (not shown) for handling hydraulic fluid overflow. The casing 104 also includes a filter port 118. The filter port 118 provides an exit for fluid in the casing 104 to enter a filter and then reenter the casing through a passage 120 connected to a charge pump 122. The charge pump 122 ordinarily creates a vacuum that pulls the fluid through the filter port 118, into the filter, then back through the filter port 118 into the passage 120. The external cooling circuit 102 leverages the overflow and filter ports 116, 118 to provide cooling to the transaxle 100.

The external cooling circuit 102 preferably includes an external reservoir 124 that is coupled between the overflow port 116 and the filter port 118. The external reservoir 124 is preferably a generally closed container that can be mounted on the casing 104 of the transaxle 100 or to other components of the mower 10. The charge pump 122 creates a vacuum that pulls cooling fluid from the external reservoir 124 into the casing 104 through the filter port 118 and passage 120. As the cooling fluid is drawn into the casing 104, a like amount of "hot" fluid will be expelled from the overflow port 116 and returned to the external reservoir 124. The external reservoir 124 may include a vent 126. If desired, a filter 128 can be placed in the external cooling circuit 102, preferably between the external reservoir 124 and the filter port 118, in order to filter the fluid as it passes back into the casing 104. For example, the filter 128 can be mounted in the conventional location of the casing 104, but with its inlet connected to the external reservoir 124.

By virtue of the presence of the external reservoir 124 connected between the overflow and filter ports 116, 118, a certain level of cooling will be achieved. Specifically, the fluid capacity of the transaxle 100 is necessarily increased, and the work of the transaxle can be distributed against the increased volume of fluid, thereby lowering the temperature.

In addition, the external cooling circuit 102 can utilize a cooler 130 that is preferably coupled between the overflow port 116 and the external reservoir 124. The cooler 130 is preferably a heat exchanger, but may be any type of mechanism for lowering the temperature of the fluid while it is outside of the casing 104, such as a fan, or the like. Further, the cooler 130 may alternatively be coupled between the external reservoir 124 and the filter 128 and/or filter port 118, be integrated with the external reservoir 124 and/or the filter 128, be formed by a plurality of coolers distributed in various locations in the external cooling circuit 102, or the like. In some embodiments, the cooler 130 can replace the external reservoir 124.

Since the cooler 130 is applied to the fluid in the external cooling circuit 102, the cooler 130 can be situated away from heat generating components of the transaxle 100, thereby allowing more effective cooling of the fluid. In testing, one embodiment of the cooling circuit 102 utilizing the cooler 130 was found to lower the temperature of the hydraulic fluid by about 80° F., as compared to the conventional operation of the transaxle 100.

Referring now to FIG. 3, an enlarged side elevation view of a portion of the external cooling circuit 102 is shown utilizing an adapter 140 in accordance with a preferred embodiment of the present invention. The adapter 140 preferably includes a body 142 that is sized and shaped to cover the filter port 118, and preferably includes an O-ring 144 mounted to a surface facing the transaxle casing 104. The O-ring 144 preferably surrounds the filter port 118 to create a seal to prevent hydraulic fluid from exiting the fluid circuit between the adapter 140 and the casing 104.

The adapter 140 also preferably includes a receptacle 146 sized and shaped to fit over an open end of the passage 120 connected to the charge pump 122. The receptacle 146 may be threaded and configured to complement a threading (not shown) on the end of the passage 120 for securing the adapter 140. However, other methods of attachment and sealing, such as press-fit or the like, may also be used. A central bore 148 is provided in fluid communication with the receptacle 146 to allow hydraulic fluid to pass from the external cooling circuit 102 into the passage 120. A fitting 150 preferably extends from the body 142 in a direction away from the casing 104 and includes a portion of the central bore 148. The fitting 150 connects with a conduit 132 (e.g., a hose) in fluid communication with the external reservoir 124. The fitting 150 may be threaded, although other methods of attachment and sealing, such as press-fit or the like, may be used as well.

FIGS. 4-6 show a particular embodiment of the adapter 140 that can be used for easily switching between conventional operation of the transaxle 100 (i.e., a closed system passing the hydraulic fluid through the filter) and operation utilizing the external cooling circuit 102. As seen in FIGS. 4 and 5, the adapter 140 includes first and second plates 152, 154. The second plate 154 preferably includes the fitting 150 (see FIG. 6) extending therefrom. The first plate 152 has an axially extending central opening 156, through which the fitting 150 passes. The first plate 152 is secured to the second plate 154 via a nut 158 that surrounds the fitting 150.

The first and second plates 152, 154 are rotatable with respect to one another about a rotation axis that passes longitudinally through the central bore 148. The first plate 152 includes a plurality of peripheral channels 160 that axially extend through the first plate 152 and are arranged in various locations surrounding the central opening 156. The second plate 154 has a complementary set of peripheral channels 162 that extend axially through the second plate 154 and are placed in various locations surrounding the fitting 150. Via relative of rotation of the first and second plates 152, 154, the peripheral channels 160, 162 in each plate 152, 154 can be aligned with one another.

When the peripheral channels 160, 162 are aligned, hydraulic fluid is enabled to pass from the filter port 118 through the adapter 140 to a filter (not shown) that is mounted on the adapter 140. The hydraulic fluid passing through the filter returns to the passage 120 via the central bore 148 of the adapter 140. Thus, conventional operation of the transaxle 100 is provided, and normal testing procedures can be employed during manufacturing. By rotating the first and second plates 152, 154 relative to one another, the first plate 152 will cover the peripheral channels 162 of the second plate 154, thereby preventing hydraulic fluid from exiting the filter port 118. To create a seal, small O-rings 164 are preferably provided to surround each of the peripheral openings 162 of the second plate 154. The small O-rings 164 compress against the first plate 152 when the plates 152, 154 are positioned to allow operation of the external cooling circuit 102. The small O-rings 164 further serve to prevent leakage of hydraulic fluid between the plates 152, 154 when the peripheral channels 160, 162 are aligned.

In a preferred embodiment, the first and second plates 152, 154 are configured to be rotated into the appropriate positions by attachment and removal of the filter. For example, by tightening the filter onto the adapter 140, the required torque will rotate the first plate 152 to place the peripheral channels 160, 162 into alignment. The torque required to remove the filter will rotate the first plate 152 counter-clockwise, closing the peripheral channels 160 therein. This provides a simple method for changing between conventional operation and use of the external cooling circuit 102.

FIG. 7 shows an alternative embodiment of an adapter 240 that can be used with a filter 128 for external cooling. Similar to the embodiment shown in FIG. 3, the adapter 240 includes a body 242 that is sized to cover the filter port 118, and includes an O-ring 244 mounted to a surface facing the transaxle casing 104. A receptacle 246 is sized and shaped to fit over the open end of the passage 120 connected to the charge pump 122, and is in fluid communication with a central bore 248 that runs axially through a fitting 250 extending from the body 242 in a direction away from the casing 104.

A hollow cavity 270 is formed in the body 242 and coaxially surrounds the fitting 250. A radial inlet 272 is provided at a peripheral edge of the body 242 and is in fluid communication with the cavity 270. The radial inlet 272 may be provided with a peripheral fitting 274 in fluid communication therewith. The peripheral fitting 274 may have a threaded end for connection to the hose 132 in fluid communication with the external reservoir 124. However, other methods of attachment and sealing, such as press-fit or the like, may be used as well. Alternatively, the hose 132 may couple directly with the radial inlet 272.

The adapter 240 preferably allows a conventional filter 128 to be coupled thereto in the same manner as the filter 128 would have been attached to the filter port 118. For example, the fitting 250 of the adapter 240 may have the same size and shape as the end of the passage 120. Sealing may be provided by an O-ring 134 of the filter 128 that surrounds the cavity 270 of the adapter 240. In operation, hydraulic fluid from the external reservoir 124 flows from the hose 132 through the radial inlet 272 of the adapter 240 and into the cavity 270. From the cavity, the hydraulic fluid enters the filter 128 and passes through a filter media 136. Once filtered, the hydraulic fluid passes into the central bore 248 of the adapter 240, where it may enter the passage 120 back to the charge pump 122.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as described above.

We claim:

1. An external cooling circuit for an integrated transaxle, comprising:
    an integrated transaxle having:
        a casing,
        a motor and a pump contained within the casing, the pump being connected to and actuable by an input shaft extending from the casing, the motor being connected to an output shaft extending from the casing
        hydraulic fluid circulated in the casing by the pump to drive the motor,
        first and second ports formed in the casing, and
        a charge pump contained within the casing; and
    a reservoir external to the casing, the reservoir being in separate fluid communication with the each of the first and second ports of the casing such that the charge pump is configured to create a vacuum at the second port to cause hydraulic fluid to exit the casing through the first port, enter the reservoir, and re-enter the casing through the second port.

2. The external cooling circuit of claim 1, wherein the second port includes an opening in a wall of the casing and an open-ended passage concentrically arranged within the opening and in fluid communication with the charge pump.

3. The external cooling circuit of claim 2, further comprising:
    an adapter configured to be removably attached to the second port and having a fitting for removable attachment to a conduit in fluid communication with the reservoir, the fitting being in fluid communication with a central axial bore of the adapter, the adapter including a receptacle that mounts to the open end of the passage of the second port.

4. The external cooling circuit of claim 3, wherein the adapter includes first and second plates connected to each other and rotatable with respect to each other about a rotation axis passing through the central axial bore of the adapter, the second plate including the fitting, which extends through a central axial opening in the first plate.

5. The external cooling circuit of claim 4, wherein the first plate includes at least one peripheral axially extending channel radially spaced apart from the central opening and the second plate includes at least one complementary peripheral axially extending channel radially spaced apart from the fitting, wherein the at least one peripheral channel of the first plate is alignable with the at least one corresponding peripheral channel of the second plate via relative rotation of the first and second plates, and wherein when the adapter is connected to the second port, the at least one peripheral channel of the second plate is in fluid communication with the opening of the wall of the casing.

6. The external cooling circuit of claim 5, further comprising a filter mounted to the adapter such that a filter media is arranged in a flow path of hydraulic fluid between the at least one peripheral channel of the first plate and the fitting.

7. The external cooling circuit of claim 2, further comprising:
    a filter having a filter media; and
    an adapter configured to be removably attached to the second port, the adapter having a central hollow cavity, a radial inlet in fluid communication with the hollow cavity, and a fitting extending axially through the hollow cavity and configured for mounting to the open end of the passage of the second port, the filter being removably attached to the fitting such that the filter media is arranged in a flow path of hydraulic fluid between the hollow cavity and the fitting.

8. The external cooling circuit of claim 1, further comprising:
    a cooler external to the casing, the cooler being connected between, and in fluid communication with, the first port and the reservoir.

9. The external cooling circuit of claim 8, wherein the cooler is a heat exchanger.

10. The external cooling circuit of claim 1, further comprising:
    a filter arranged external to the casing, the filter being connected between, and in fluid communication with, the reservoir and the second port.

11. The external cooling circuit of claim 1, wherein the first port is an overflow port of the integrated transaxle and the second port is a filter port of the integrated transaxle.

12. An adapter for use with an external cooling circuit of an integrated transaxle and a filter, the integrated transaxle having a casing and a filter port, the filter port including an opening in a wall of the casing and an open-ended passage concentrically arranged within the opening and in fluid communication with a charge pump, the adapter comprising:
    a first plate with an axially extending central opening;
    a second plate connected to the first plate and rotatable with respect to the first plate about a rotation axis passing longitudinally through the central opening of the first plate;
    a fitting extending from the second plate and passing through the central opening of the first plate;
    at least one first peripheral axially extending channel arranged in the first plate and radially spaced apart from the central opening; and
    at least one second peripheral axially extending channel arranged in the second plate and radially spaced apart from the fitting, the at least one first peripheral channel being alignable with the at least one second peripheral channel via relative rotation of the first and second plates.

13. The adapter of claim 12, wherein the second plate includes at least one O-ring arranged on a surface of the second plate facing the first plate, the at least one O-ring being in contact with the first plate and surrounding the at least one second peripheral channel.

14. The adapter of claim 12, further comprising an O-ring surrounding the at least one second peripheral channel and the fitting, and being arranged on a surface of the second plate facing away from the first plate.

15. The adapter of claim 12, wherein the fitting is threaded at an end extending away from the first plate.

16. The adapter of claim 12, further comprising a nut that surrounds the fitting and is arranged at a surface of the first plate facing away from the second plate.

17. An external cooling circuit for an integrated transaxle, comprising:
an integrated transaxle having:
a casing,
a motor and a pump contained within the casing, the pump being connected to and actuable by an input shaft extending from the casing, the motor being connected to an output shaft extending from the casing
hydraulic fluid circulated in the casing by the pump to drive the motor,
first and second ports formed in the casing, and
a charge pump contained within the casing, the second port including an opening in a wall of the casing and an open-ended passage concentrically arranged within the opening and in fluid communication with the charge pump;
a reservoir external to the casing, the reservoir being in fluid communication with the first and second ports of the casing such that the charge pump is configured to create a vacuum at the second port to cause hydraulic fluid to exit the casing through the first port, enter the reservoir, and re-enter the casing through the second port; and
an adapter configured to be removably attached to the second port and having a fitting for removable attachment to a conduit in fluid communication with the reservoir, the fitting being in fluid communication with a central axial bore of the adapter, the adapter including a receptacle that mounts to the open end of the passage of the second port,
wherein the adapter includes first and second plates connected to each other and rotatable with respect to each other about a rotation axis passing through the central axial bore of the adapter, the second plate including the fitting, which extends through a central axial opening in the first plate.

18. The external cooling circuit of claim 17, wherein the first plate includes at least one peripheral axially extending channel radially spaced apart from the central opening and the second plate includes at least one complementary peripheral axially extending channel radially spaced apart from the fitting, wherein the at least one peripheral channel of the first plate is alignable with the at least one corresponding peripheral channel of the second plate via relative rotation of the first and second plates, and wherein when the adapter is connected to the second port, the at least one peripheral channel of the second plate is in fluid communication with the opening of the wall of the casing.

19. The external cooling circuit of claim 18, further comprising a filter mounted to the adapter such that a filter media is arranged in a flow path of hydraulic fluid between the at least one peripheral channel of the first plate and the fitting.

20. An external cooling circuit for an integrated transaxle, comprising:
an integrated transaxle having:
a casing,
a motor and a pump contained within the casing, the pump being connected to and actuable by an input shaft extending from the casing, the motor being connected to an output shaft extending from the casing
hydraulic fluid circulated in the casing by the pump to drive the motor,
first and second ports formed in the casing, and
a charge pump contained within the casing, the second port including an opening in a wall of the casing and an open-ended passage concentrically arranged within the opening and in fluid communication with the charge pump;
a reservoir external to the casing, the reservoir being in fluid communication with the first and second ports of the casing such that the charge pump is configured to create a vacuum at the second port to cause hydraulic fluid to exit the casing through the first port, enter the reservoir, and re-enter the casing through the second port;
a filter having a filter media; and
an adapter configured to be removably attached to the second port, the adapter having a central hollow cavity, a radial inlet in fluid communication with the hollow cavity, and a fitting extending axially through the hollow cavity and configured for mounting to the open end of the passage of the second port, the filter being removably attached to the fitting such that the filter media is arranged in a flow path of hydraulic fluid between the hollow cavity and the fitting.

* * * * *